US009405509B2

(12) United States Patent
Hirsch et al.

(10) Patent No.: US 9,405,509 B2
(45) Date of Patent: *Aug. 2, 2016

(54) PARALLEL COMPUTATION OF A REMAINDER BY DIVISION OF A SEQUENCE OF BYTES

(71) Applicant: INTERNATIONAL BUSINESS MACHINES CORPORATION, Armonk, NY (US)

(72) Inventors: Michael Hirsch, Mazkeret Batya (IL); Shmuel T. Klein, Rehovot (IL); Yair Toaff, Givat Shmuel (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 26 days.

This patent is subject to a terminal disclaimer.

(21) Appl. No.: 14/574,162

(22) Filed: Dec. 17, 2014

(65) Prior Publication Data

US 2015/0106417 A1    Apr. 16, 2015

Related U.S. Application Data

(63) Continuation of application No. 13/495,533, filed on Jun. 13, 2012, now Pat. No. 8,935,310, which is a continuation of application No. 12/968,679, filed on Dec. 15, 2010, now Pat. No. 8,930,431.

(51) Int. Cl.
*G06F 7/44* (2006.01)
*G06F 7/46* (2006.01)
*G06F 7/72* (2006.01)

(52) U.S. Cl.
CPC .... *G06F 7/462* (2013.01); *G06F 7/44* (2013.01); *G06F 7/72* (2013.01)

(58) Field of Classification Search
None
See application file for complete search history.

(56) References Cited

U.S. PATENT DOCUMENTS

| 3,980,874 | A  | 9/1976  | Vora |
| 4,190,893 | A  | 2/1980  | Gajski |
| 4,555,769 | A  | 11/1985 | Carter et al. |
| 4,949,293 | A  | 8/1990  | Kawamura et al. |
| 7,031,995 | B2 | 4/2006  | Schmandt et al. |
| 7,523,098 | B2 | 4/2009  | Hirsch et al. |

(Continued)

FOREIGN PATENT DOCUMENTS

JP    2002162904 A    6/2002

OTHER PUBLICATIONS

Deephan Mohan et al., Faster File Matching Using GPGPUs, 3 pages, Department of Computer and Information Sciences.

(Continued)

*Primary Examiner* — Matthew Sandifer
(74) *Attorney, Agent, or Firm* — Griffiths & Seaton PLLC

(57) ABSTRACT

Methods, computer systems, and computer program products for calculating a remainder by division of a sequence of bytes interpreted as a first number by a second number are provided. A first subset of bytes is read, and an associated first remainder by division is calculated and stored in the memory location from which the subset was read. A second subset of bytes is read, and an associated second remainder by division is calculated with a second processor. The calculating of the second remainder by division may occur at least partially during the calculating of the first remainder by division. A third and fourth subset of bytes is read and associated remainders are calculated.

17 Claims, 3 Drawing Sheets

(56) References Cited

U.S. PATENT DOCUMENTS

| | | |
|---|---|---|
| 7,555,692 B1 | 6/2009 | Iacobovici |
| 7,849,125 B2 | 12/2010 | Shen |
| 7,950,062 B1 | 5/2011 | Ren et al. |
| 8,438,549 B1 | 5/2013 | McCoy et al. |
| 2002/0010702 A1 | 1/2002 | Ajtai et al. |
| 2004/0098435 A1 | 5/2004 | Moore |
| 2004/0199931 A1 | 10/2004 | Kumar et al. |
| 2008/0025502 A1* | 1/2008 | Kounavis ............ G06F 7/722 380/30 |
| 2008/0033942 A1 | 2/2008 | Kao et al. |
| 2008/0065639 A1 | 3/2008 | Choudhary et al. |
| 2008/0195606 A1 | 8/2008 | Ren et al. |
| 2009/0003502 A1 | 1/2009 | Campiche et al. |
| 2009/0287628 A1 | 11/2009 | Indeck et al. |
| 2010/0077482 A1 | 3/2010 | Adams |
| 2010/0138725 A1 | 6/2010 | Ikeda |
| 2010/0146027 A1 | 6/2010 | Dao et al. |
| 2010/0198892 A1 | 8/2010 | Motozuka |
| 2012/0131082 A1 | 5/2012 | Hirsch et al. |
| 2012/0271873 A1 | 10/2012 | Hirsch et al. |
| 2013/0204916 A1 | 8/2013 | Boersma et al. |

OTHER PUBLICATIONS

Lior Aronovich, The Design of a Similarity Based Deduplication System, 14 pages, Haifa, Israel.

* cited by examiner

US 9,405,509 B2

PARALLEL COMPUTATION OF A REMAINDER BY DIVISION OF A SEQUENCE OF BYTES

REFERENCE TO RELATED APPLICATIONS

This application is a Continuation of U.S. patent application Ser. No. 13/495,533, filed on Jun. 13, 2012, which is a Continuation of U.S. patent application Ser. No. 12/968,679, filed on Dec. 15, 2010, the contents of which are incorporated herein by reference.

BACKGROUND OF THE INVENTION

1. Field of the Invention

The present invention relates in general to computers, and more particularly to methods, computer systems, and computer program products for parallel computation of a remainder by division of a sequence of bytes.

2. Description of the Related Art

The Rabin-Karp hash is used extensively in string matching algorithms, in part because it is a rolling hash. That is, an initial (or base) hash is calculated for a window (or seed) of bytes that is a part of a larger segment of data. Then the window is shifted down one byte (i.e. one byte from the segment leaves the window and another enters). Then the hash of the bytes in the window at its new position is calculated.

Calculating the initial hash of the window at the start of the segment requires considerable processing power. In particular, it requires O(n) operations, where n is the size of the window.

However, recalculating the hash after the window shifts is a much less exhaustive process and requires only the following operations: a figurative subtraction to compensate for the byte leaving the window, a shift and normalization to account for the bytes in the window shifting their positions, a figurative addition to account for the byte entering the window, and calculating a remainder of the division of the result so far by a given number P.

SUMMARY OF THE DESCRIBED EMBODIMENTS

In one embodiment, a method for calculating a remainder by division of a sequence of bytes interpreted as a first number by a second number is provided, and comprises reading a first subset of a sequence of bytes from a memory, and calculating and storing an associated first remainder by division with a first hardware processor device, the first remainder stored in the memory location from which the first subset was read; reading a second subset of a sequence of bytes from the memory, and calculating and storing an associated second remainder by division with a second hardware processor device, the second remainder stored in the memory location from which the second subset was read, wherein the calculating of the second remainder by division occurs at least partially during the calculating of the first remainder by division; reading the first and second remainders from memory, and calculating and storing a third remainder by division with the first hardware processor device based on the calculating of the first remainder by division and the calculating of the second remainder by division, the third remainder stored in the memory location from which the first and second remainders were read; reading a third subset of the sequence of bytes from the memory, and calculating and storing an associated fourth remainder by division with a third hardware processor device, the fourth remainder stored in the memory location from which the third subset was read, wherein the calculating of the fourth remainder by division occurs at least partially during the calculating of the second remainder by division; and reading a fourth subset of the sequence of bytes from the memory, and calculating and storing an associated fifth remainder by division with a fourth hardware processor device, the fifth remainder stored in the memory location from which the fourth subset was read, wherein the calculating of the fifth remainder by division occurs at least partially during the calculating of the fourth remainder by division. In another embodiment, a computer system uses the aforementioned method. In a further embodiment, a computer program product is provided using the same technique.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Embodiments of the present invention provide methods, computer systems, and program product codes for calculating or evaluating remainders by division, such as Rabin-Karp hashes. The calculation of the remainder by division (e.g., the Rabin-Karp hash) described herein is performed "in parallel" by multiple processors, or processor devices in order to increase the speed at which the calculation takes place and reduce the system resources that are required.

Figure 1:
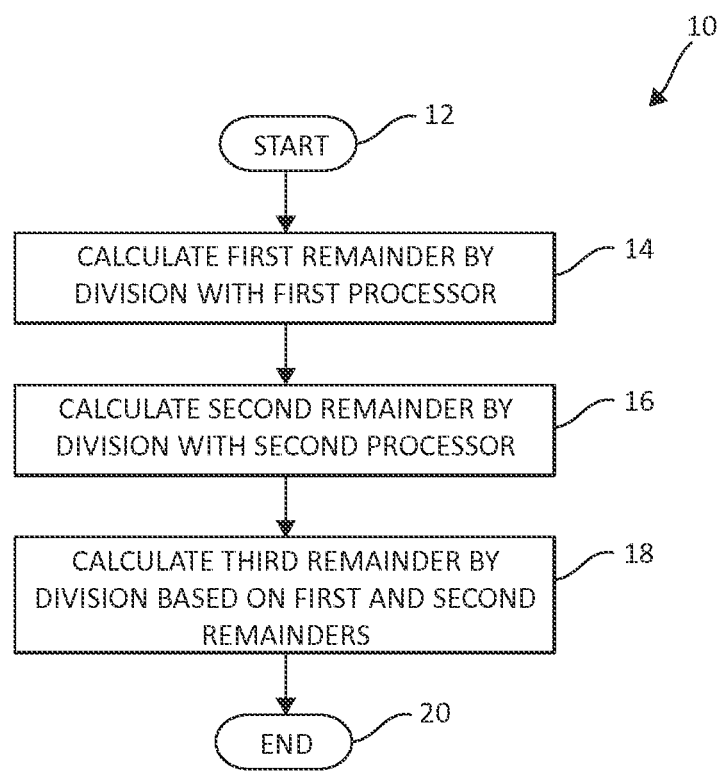
FIG. 1 is a flow chart of a method for calculating a remainder by division according to one embodiment of the present invention.

FIG. 1 illustrates a method 10 for calculating a remainder by division, according to one embodiment of the present invention. At step 12, the method 10 begins with, for example, a sequence of bytes of a binary string being divided into multiple blocks or subsets, as described in greater detail below. At step 14, a first remainder by division associated with a first subset (or block) of the sequence of bytes is calculated with a first processor. At step 16, a second remainder by division associated with a second subset of the sequence of bytes is calculated with a second processor. The calculating of the second remainder by division may occur at least partially during the calculating of the first remainder by division. At step 18, a third remainder by division is calculated based on the calculating of the first remainder by division and the calculating of the second remainder by division. At step 20, the method 10 ends. However, as described below, some embodiments of the present invention may include additional steps.

Figure 2:
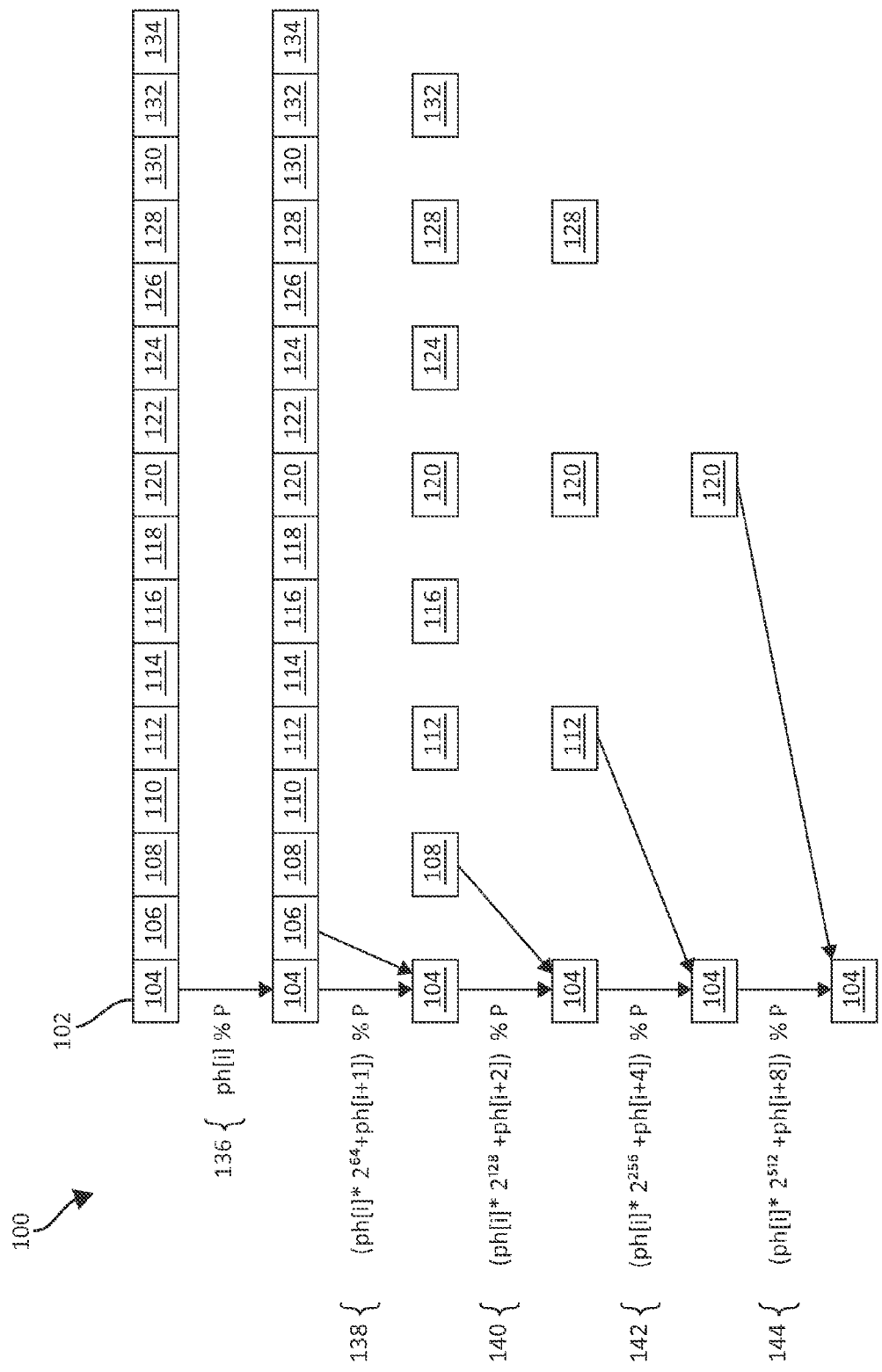
FIG. 2 is a block diagram of a method and/or computing system for calculating a Rabin-Karp hash according to another embodiment of the present invention.

FIG. 2 is a block diagram (or flow chart) illustrating such a method (or computing system) 100 according to one embodiment of the present invention. The method 100 begins with a binary string, or segment, 102 of for example 512 bytes. As shown, the segment includes blocks 104-134. However, although only 16 blocks 104-134 are shown, it should be understood that the segment 102 may actually include 64 such blocks in this example (i.e., a first block, a second block, a third block, . . . and a sixty-fourth block), with each block including 8 bytes. It should also be understood that each of the blocks 104-134 may be associated with a processor or processor device of a computing system (i.e., with 64 processors), each of which is assigned to a respective block of the segment 102.

As is described in greater detail below, at step 136 each of the processors (e.g., 64) calculates a remainder by division ph[i] mod P for the respective block of the segment 102, with the processors working simultaneously. Generally, the method 100 includes additional steps 138-144, each of which includes calculating a single remainder by division value for each pair of the remainder by division values from the previous step, using the formulas shown in FIG. 2 and utilizing half as many processors as in the previous step, again working simultaneously.

For example, at step 136 the remainder by division values for blocks 104 and 106 are calculated simultaneously using two separate processors, as are the remainder by division values for blocks 108 and 110. Then, at step 138, the remainder by division values for blocks 104 and 106 are combined by the processor originally associated with block 104, and the remainder by division values for blocks 108 and 110 are combined by the processor originally associated with block 108. As shown in FIG. 2, this process continues to step 144, where only processor 104 is being used to calculate a final remainder by division value for the segment 102. FIG. 2 includes only five steps (136, 138, 140, 142 and 144) because the diagram shown only illustrates the process for 16 blocks (104-134), the process completes in $(1+\log_2 16)=5$ steps. In the general case of $2^n$ blocks, $(1+\log_2 2^n)=(1+n)$ steps are necessary. Further details of this process are provided below.

One of the primary aspects of using a Rabin-Karp scheme is a repeated application of a rolling hash evaluation. In addition to those described herein, aspects of the Rabin-Karp has are described in U.S. Pat. No. 7,523,098. In the chosen context, there is a need to calculate the value B mod P, where B is an integer represented by a 512 bytes long string, and P is a constant prime number, in one example $P=2^{55}-55$. The main idea of a rolling hash is that when consecutive strings $B_i$ and $B_{i+1}$ are to be evaluated, and these 2 strings are mainly overlapping (typically $B_i=x_i x_{i+1} \ldots x_{i+511}$ are some substrings of a larger given text $T=x_1 \ldots x_n$, so that $B_i$ and $B_{i+1}$ overlap in all but their first and last bytes), this evaluation may be done in constant time, independently of the length of the strings.

The constant time, however, is based on the fact that for a given $B_{i+1}$, one may use the value obtained earlier for $B_i$. However, this is not the case for the first value to be used. That is, $B_1$ needs an evaluation time proportional to its length, which is 512 in this embodiment. According to one aspect of the present invention, local parallelism is applied, by means of the availability of several processors, to speed up this initial calculation.

Consider again the string $B_1$ of length 512 bytes, partitioned into 64 subblocks of 8 bytes each, denoted A[0], . . . , A[63], such as that shown in FIG. 2. According to one aspect of the present invention, the evaluation of $B_1$ mod P is split so as to evaluate functions of the A[i] in parallel on independent processors to yield increased calculation speed. As such, $$B_1 \bmod P = \left( \sum_{i=0}^{63} A[i] \times 2^{64 \times (63-i)} \right) \bmod P \quad (1)$$

Considering it as a polynomial (set $x=2^{64}$, then $B_1=\sum_{j=0}^{63} A[63-j] x_j$), Homer's rule may be applied to evaluate it iteratively. First, the constant C must be calculated, as defined by $$C=2^{64} \bmod P = 2^{55} \times 2^9 \bmod(2^{55}-55)=55 \times 512=28160 \quad (2)$$

Since the divisor P is constant, one may use $\overline{X}=X \bmod P$ as a shortcut notation for any integer X. Note then that if a string D of 16 bytes is considered, to evaluate $\overline{D}$, the decomposition $D=D1 \times 2^{64}+D2$ may be used, where D1 and D2 are the respective leftmost and rightmost 8 bytes of D. This becomes $\overline{D}=\overline{D1 \times 2^{64}+D2}=\overline{D1} \times C+D2$. Generalizing to 64 blocks of 8 bytes each $R \leftarrow 0$ for $i \leftarrow 0$ to 63 do $$R \leftarrow (R \times C + A[i]) \bmod P \quad (3)$$

A further improvement may then be obtained by passing to a hierarchical tree structure and exploiting the parallelism repeatedly in $\log_2 n$ layers, where n is the initial number of blocks. In step 0 (i.e., step 136 in FIG. 1), the n processors (e.g., 64) are used to evaluate A[i] mod P for $0 \le i < n$ in parallel. This results in n residues, which may be stored in the original place of the n blocks A[i] themselves (only 55 of the 64 bits are used).

In step 1 (i.e., step 138 in FIG. 2), only n/2 processors are used (it is convenient to use those with even indices), and each of them works, in parallel, on two adjacent blocks: $p_0$ (i.e., processor associated with block 104 in FIG. 2) working on A[0] and A[1], $p_2$ (i.e., processor associated with block 108) working on A[2] and A[3], and generally $p_{2k}$ working on A[2k] and A[2k+1], $$k = 0, 1, 2, \ldots, \frac{n}{2} - 1.$$

The work performed by each of these processors is what has been described earlier for the string D of 16 bytes. Again, the results are stored in-place, that is, right justified in 16-byte=128-bit blocks, of which only the rightmost 55 bits will be affected.

In step 2 (i.e., step 140 in FIG. 2), the n/4 processors whose indices are multiples of 4 are used, and each of them is applied, in parallel, on two adjacent blocks of the previous step. That is, $p_0$ should have now been applied to A[0]A[1] and A[2]A[3], etc., but in fact it is known that A[0] and A[2] contain only zeros, so the process may be simplified: $p_0$ may be applied on A[1] and A[3], and in parallel $p_4$ on A[5] and A[7], and generally $p_{4k}$ working on A[4k+1] and A[4k+3], $$k = 0, 1, 2, \ldots, \frac{n}{4} - 1.$$

Again, the work performed by each of these processors is what has been described earlier for the string D of 16 bytes since we are combining 2 blocks, with the difference that the constant C should now be $2^{128} \bmod P = \overline{C^2} = \overline{\overline{C^2}} = 792,985,600$. The results will be stored right-justified in 32-byte=256-bit blocks, of which, as before, only the rightmost 55 bits will be affected.

Continuing with further steps yields a single operation after $\log_2 n$ iterations. It should be noted that the overall work is not reduced by this hierarchical approach, since the total number of applications of the procedure on block pairs is $$\frac{n}{2} + \frac{n}{4} + \ldots = n - 1,$$

just as for the sequential evaluation. However, accounting only once for operations that are executed in parallel, the number of evaluations is reduced to $1+\log_2 n$, which should result is a significant speedup.

Summarizing, given a string B partitioned into $n=2^m$ blocks $A[0], \ldots, A[n-1]$, and given n processors $p_0, \ldots, p_{n-1}$, an array of constants is first evaluated $C[i]=\overline{C^{2^{i-1}}}=\overline{2^{64 \times 2^{i-1}}}$ to be used in step i for $i=1, \ldots, m-1$. This may be done noticing that $C[1]=C$ and $C[i+1]=\overline{C[i]^2}$ for $i \geq 1$. The parallel procedure then becomes:

$$\begin{aligned}&\text{for } k \leftarrow 0 \text{ to } n-1 \text{ do} \quad (4)\\ &\quad A[k] \leftarrow A[k] \bmod P\\ &\text{for } i \leftarrow 1 \text{ to } m \text{ do}\\ &\quad \text{for } k \leftarrow 0 \text{ to } \frac{n}{2^i} - 1 \text{ do}\end{aligned}$$

use processor $p_{2^i k}$ to evaluate, in parallel, $$A[2^i k + 2^i - 1] \leftarrow (A[2^i k + 2^{i-1} - 1] \times C[i] + A[2^i k + 2^i - 1])\\\bmod P$$

Thus, according to one aspect of the present invention a method is provided for the parallel evaluation by a set of processors of the remainder of the division of an input number B by another input number P, where B is represented by a binary string of length t×n bytes, n being a power of 2 for convenience and denoting the number of available processors, t being some integer, and P being a fixed number of length at most t bytes=8t bits.

First, B is partitioned into n blocks of t bytes each, denoted by $A[0], \ldots, A[n-1]$. A first step (i.e., step 0, or step 136 in FIG. 2) of the algorithm is performed using the processor indexed k to evaluate the remainder of the division by P of the integer represented by the binary string A[k] and storing the result right justified and with leading zeros in the block A[k] itself, for k in the range 0 to n−1, all n processors working in parallel. The resulting blocks A[k] are basic blocks of step 0 and are denoted as A[0, k].

The next steps (i.e., steps 1 to m, or steps 138-144 in FIG. 2) are performed, where $2^m = n$ and step i, for i in the range 1 to m. These steps include defining the basic block indexed k of step i, denoted as A[i, k], as the concatenation of the two adjacent basic blocks indexed 2k and 2k+1 of step i−1, A[i−1,2k] and A[i−1,2k+1], for k in the range 0 to $$\frac{n}{2^i} - 1;$$

The processor indexed $2^i k$ is used to evaluate the remainder of the division by P of the integer represented by the binary string stored in the basic block A[i, k], and to store the result right justified and with leading zeros in the block A[i, k] itself, for k in the range 0 to $$\frac{n}{2^i} - 1, \text{ all } \frac{n}{2^i}$$

processors working in parallel. The evaluation includes, in one embodiment, at most three operations of integers of size t bytes: one multiplication by a constant C[i] depending only on the step i, one addition and one evaluation of a remainder of a division by P. In one embodiment, no intermediate number produced by this calculation needs more than 2t bytes for its representation, twice the size of P.

Figure 3:
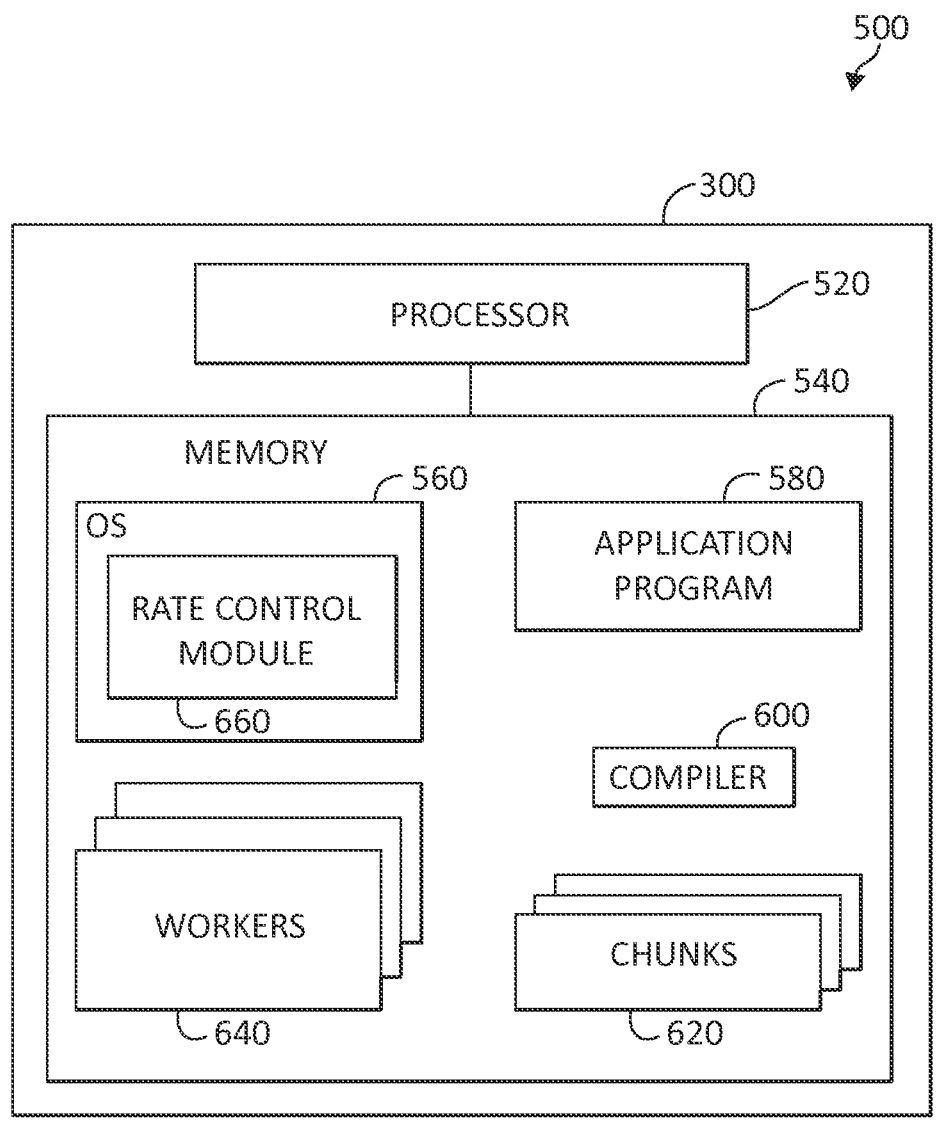
FIG. 3 is a block diagram of an exemplary computing system according to one embodiment of the present invention.

FIG. 3 illustrates an exemplary computing system 500 (or portion of a deduplication system 300) in which the methods described herein may be implemented. The portion 500 of the deduplication system 300 is operable in a computer environment as a portion thereof, in which mechanisms of the above illustrated embodiments may be implemented. It should be appreciated, however, that FIG. 3 is only exemplary and is not intended to state or imply any limitation as to the particular architectures in which the exemplary aspects of the various embodiments may be implemented. Many modifications to the architecture depicted in FIG. 3 may be made without departing from the scope and spirit of the following description and claimed subject matter.

The deduplication system 300 includes a processor 520 and a memory 540, such as random access memory (RAM). The deduplication system 300 may be operatively coupled to several components not illustrated for purposes of convenience, including a display, which presents images such as windows to the user on a graphical user interface, a keyboard, mouse, printer, and the like. Of course, those skilled in the art will recognize that any combination of the above components, or any number of different components, peripherals, and other devices, may be used with the deduplication system 300.

In the illustrated embodiment, the deduplication system 300 operates under control of an operating system (OS) 560 (e.g. z/OS, OS/2, LINUX, UNIX, WINDOWS, MAC OS) stored in the memory 540, and interfaces with the user to accept inputs and commands and to present results.

The deduplication system 300 may implement a compiler 600 that allows an application program 580 written in a programming language such as COBOL, PL/1, C, C++, JAVA, ADA, BASIC, VISUAL BASIC or any other programming language to be translated into code that is readable by the processor 520. After completion, the computer program 580 accesses and manipulates data stored in the memory 560 of the system 300 using the relationships and logic that was generated using the compiler 600.

To further implement and execute mechanisms and processes according to the present invention, OS 560, in conjunction with the memory 540, the processor 520, the program 580, and other computer processing, networking, and storage components, may implement workers 640 in order to process chunks 620 of deduplicated data. The deduplicated documents processed by the deduplication system 300 may be stored in the memory 540 in a format consistent with the present invention. As the skilled artisan will appreciate, the mechanisms of the workers 640 and the chunks 620 as presently illustrated may be implemented in various forms and architectures. Accordingly, the illustration of the workers 640 and the chunks 620 in the present figure is again intended to demonstrate logical relationships between possible computing components in the deduplication system 300, and not to imply a specific physical structure or relationship.

In one embodiment, instructions implementing the operating system 560, the computer program 580, and the compiler 600, as well as the workers 640 and chunks 620 are tangibly embodied in a computer-readable medium, which may include one or more fixed or removable data storage devices, such as a zip drive, disk, hard drive, DVD/CD-ROM, digital tape, SSDs, etc. Further, the operating system 560 and the computer program 580 comprise instructions (e.g., in executable portions) which, when read and executed by the system 300, cause the system 300 to perform the steps necessary to implement and/or use the present invention. The computer program 580 and/or the operating system 560 instructions may also be tangibly embodied in the memory 560 and/or transmitted through or accessed by network 200 via various components. As such, the terms "article of manufacture," "program storage device" and "computer program product" as may be used herein are intended to encompass a computer program accessible and/or operable from any computer readable device or media.

Embodiments of the present invention may include one or more associated software application programs 580 that include, for example, functions for managing a distributed computer system comprising a network of computing devices, such as a storage area network (SAN). Accordingly, the processor 520 may comprise one or more storage management processors (SMP). The program 580 may operate within a single computer and/or deduplication system 300 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

Although the present invention has been described above on the basis of the embodiment, the technical scope of the present invention is not limited to the above embodiment. It is apparent to those skilled in the art that various modifications or improvements can be added to the above embodiment.

It should be noted that execution orders of processes, such as operations, procedures, steps and stages in the devices, systems, programs and methods shown in the scope of claims, the description and the drawings, are not clearly specified particularly by use of expressions such as "before" and "prior to." Therefore, those processes are executable in any orders unless an output from a preceding process is used in a process subsequent thereto. Even if any operational flow in the scope of claims, in the description or in the drawings has been described by use of expressions such as "firstly," and "subsequently," for the sake of convenience, this does not necessarily mean that the operational flow has to be executed by an order indicated by these expressions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions (i.e., executable portions) for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for calculating a remainder by division of a sequence of bytes interpreted as a first number by a second number, the method comprising:

reading a first subset of a sequence of bytes from a memory, and calculating and storing an associated first remainder by division with a first hardware processor device, the first remainder stored in the memory location from which the first subset was read;

reading a second subset of a sequence of bytes from the memory, and calculating and storing an associated second remainder by division with a second hardware processor device, the second remainder stored in the memory location from which the second subset was read, wherein the calculating of the second remainder by division occurs at least partially during the calculating of the first remainder by division;

reading the first and second remainders from memory, and calculating and storing a third remainder by division with the first hardware processor device based on the calculating of the first remainder by division and the calculating of the second remainder by division, the third remainder stored in the memory location from which the first and second remainders were read;

reading a third subset of the sequence of bytes from the memory, and calculating and storing an associated fourth remainder by division with a third hardware processor device, the fourth remainder stored in the memory location from which the third subset was read, wherein the calculating of the fourth remainder by division occurs at least partially during the calculating of the second remainder by division;

reading a fourth subset of the sequence of bytes from the memory, and calculating and storing an associated fifth remainder by division with a fourth hardware processor device, the fifth remainder stored in the memory location from which the fourth subset was read, wherein the calculating of the fifth remainder by division occurs at least partially during the calculating of the fourth remainder by division; and generating the final remainder by division of the sequence of bytes based on the third, fourth, and fifth remainders.

2. The method of claim 1, wherein generating the final remainder by division further includes reading the fourth and fifth remainders from the memory, and calculating and storing an associated sixth remainder by division with the third hardware processor device based on the calculating of the fourth remainder by division and the calculating of the fifth remainder by division, the sixth remainder stored in the memory location from which the fourth and fifth remainders were read, wherein the calculating of the sixth remainder by division occurs after the calculating of the fourth remainder by division and the calculating of the fifth remainder by division, and wherein calculating the sixth remainder by division occurs at least partially during the calculating of the third remainder by division.

3. The method of claim 2, wherein generating the final remainder by division further includes reading the third and sixth remainders from the memory, and calculating and storing a seventh remainder by division with the first hardware processor device based on the calculating of the third remainder by division and the calculating of the sixth remainder by division, and receiving an output from the third processor device, the seventh remainder stored in the memory location from which the third and sixth remainders were read, wherein the calculating of the seventh remainder by division occurs after the calculating of the third remainder by division and the calculating of the sixth remainder by division.

4. The method of claim 1, wherein generating the final remainder by division further comprises calculating a plurality of additional remainders by division such that n hardware processor devices are utilized and the final remainder by division is calculated in $1+\log_2 n$ steps.

5. The method of claim 4, wherein the second number is a prime number.

6. The method of claim 5, further comprising calculating a Rabin Karp hash based on the final remainder by division.

7. A computer system for calculating a remainder by division of a sequence of bytes interpreted as a first number by a second number comprising:

a first hardware processor device adapted for reading a first subset of a sequence of bytes from a memory, and calculating and storing an associated first remainder by division, the first remainder stored in the memory location from which the first subset was read;

a second hardware processor device adapted for reading a second subset of a sequence of bytes from the memory, and calculating and storing an associated second remainder by division, wherein the calculating of the second remainder by division occurs at least partially during the calculating of the first remainder by division and the second remainder is stored in the memory location from which the second subset was read, wherein the first hardware processor is further adapted for reading the first and second remainders from memory, and calculating and storing a third remainder by division based on the calculating of the first remainder by division and the calculating of the second remainder by division, the third remainder stored in the memory location from which the first and second remainders were read;

a third hardware processor device adapted for reading a third subset of the sequence of bytes from the memory, and calculating and storing an associated fourth remainder by division, wherein the calculating of the fourth remainder by division occurs at least partially during the calculating of the second remainder by division and the fourth remainder is stored in the memory location from which the third subset was read; and a fourth hardware processor device adapted for reading a fourth subset of the sequence of bytes from the memory, and calculating and storing an associated fifth remainder by division, wherein the calculating of the fifth remainder by division occurs at least partially during the calculating of the fourth remainder by division and the fifth remainder is stored in the memory location from which the fourth subset was read;

wherein the final remainder by division of the sequence of bytes is generated based on the third, fourth, and fifth remainders.

8. The computer system of claim 7, wherein the third hardware processor device is further adapted for reading the fourth and fifth remainders from the memory, and calculating and storing an associated sixth remainder by division based on the calculating of the fourth remainder by division and the calculating of the fifth remainder by division, wherein calculating the sixth remainder by division occurs at least partially during the calculating of the third remainder by division and the sixth remainder is stored in the memory location from which the fourth and fifth remainders were read, wherein generating the final remainder by division is further based on the sixth remainder.

9. The computer system of claim 8, wherein the first hardware processor device is further adapted for reading the third and sixth remainders from the memory, and calculating and storing a seventh remainder by division based on the calculating of the third remainder by division and the calculating of the sixth remainder by division, and receiving an output from the third processor device, the seventh remainder stored in the memory location from which the third and sixth remainders were read, wherein generating the final remainder by division is further based on the seventh remainder.

10. The computer system of claim 7, further comprising n hardware processors adapted for calculating a plurality of additional remainders by division such that the final remainder by division is calculated in $1+\log_2 n$ steps.

11. The computer system of claim 10, wherein the computer system is adapted for calculating the final remainder by division of the sequence of bytes interpreted as a first number by a second number, and wherein the second number is a prime number.

12. The computer system of claim 11, wherein at least one of the n hardware processors is further adapted for calculating a Rabin Karp hash based on the final remainder by division.

13. A computer program product for calculating a remainder by division of a sequence of bytes interpreted as a first number by a second number in a computing environment with a plurality of processor devices, the computer program product comprising a non-transitory computer-readable storage medium having computer-readable program code portions stored therein, the computer-readable program code portions comprising:

a first executable portion for reading a first subset of a sequence of bytes from a memory, and calculating and storing an associated first remainder by division with a first hardware processor device, the first remainder stored in the memory location from which the first subset was read;

a second executable portion for reading a second subset of a sequence of bytes from the memory, and calculating and storing an associated second remainder by division with a second hardware processor device, the second remainder stored in the memory location from which the second subset was read, wherein the calculating of the second remainder by division occurs at least partially during the calculating of the first remainder by division;

a third executable portion for reading the first and second remainders from memory, and calculating and storing a third remainder by division with the first hardware processor device based on the calculating of the first remainder by division and the calculating of the second remainder by division, the third remainder stored in the memory location from which the first and second remainders were read;

a fourth executable portion for reading a third subset of the sequence of bytes from the memory, and calculating and storing an associated fourth remainder by division with a third hardware processor device, the fourth remainder stored in the memory location from which the third subset was read, wherein the calculating of the fourth remainder by division occurs at least partially during the calculating of the second remainder by division; and a fifth executable portion for reading a fourth subset of the sequence of bytes from the memory, and calculating and storing an associated fifth remainder by division with a fourth hardware processor device, the fifth remainder stored in the memory location from which the fourth subset was read, wherein the calculating of the fifth remainder by division occurs at least partially during the calculating of the fourth remainder by division;

wherein the final remainder by division of the sequence of bytes is generated based on the third, fourth, and fifth remainders.

14. The computer program product of claim 13, further including a sixth executable portion for reading the fourth and fifth remainders from the memory, and calculating and storing an associated sixth remainder by division with the third hardware processor device based on the calculating of the fourth remainder by division and the calculating of the fifth remainder by division, the sixth remainder stored in the memory location from which the fourth and fifth remainders were read, wherein the calculating of the sixth remainder by division occurs after the calculating of the fourth remainder by division and the calculating of the fifth remainder by division, and wherein calculating the sixth remainder by division occurs at least partially during the calculating of the third remainder by division, wherein generating the final remainder by division is further based on the sixth remainder.

15. The computer program product of claim 14, further including a seventh executable portion for reading the third and sixth remainders from the memory, and calculating and storing a seventh remainder by division with the first hardware processor device based on the calculating of the third remainder by division and the calculating of the sixth remainder by division, and receiving an output from the third processor device, the seventh remainder stored in the memory location from which the third and sixth remainders were read, wherein the calculating of the seventh remainder by division occurs after the calculating of the third remainder by division and the calculating of the sixth remainder by division, wherein generating the final remainder by division is further based on the seventh remainder.

16. The computer program product of claim 13, further comprising a plurality of additional executable portions for calculating a plurality of additional remainders by division such that n processors are utilized and the final remainder by division is calculated in $1+\log_2 n$ steps and calculating a Rabin Karp hash based on the final remainder by division.

17. The computer program product of claim 16, wherein the second number is a prime number.

* * * * *